United States Patent [19]

Yamada et al.

[11] Patent Number: 4,649,500
[45] Date of Patent: Mar. 10, 1987

[54] COLLECTION METHOD OF DATA ON FEED AMOUNT OF PRINTING INK AND SYSTEM THEREFOR

[75] Inventors: Mitsuhiko Yamada, Kyoto; Hideaki Kitamura, Osaka, both of Japan

[73] Assignee: Dainippon Screen Mfg. Co., Ltd., Kyoto, Japan

[21] Appl. No.: 758,479

[22] Filed: Jul. 24, 1985

[30] Foreign Application Priority Data

Oct. 26, 1984 [JP] Japan ................... 59-223900

[51] Int. Cl.$^4$ .................. G06F 15/70; H04N 1/22; H04N 1/46; B41M 1/14
[52] U.S. Cl. .................. 364/518; 358/75; 358/101; 358/107; 358/298; 101/170
[58] Field of Search .............. 364/518, 523, 526; 358/75, 78, 101, 107, 296, 298; 101/DIG. 24, 170; 250/559

[56] References Cited

U.S. PATENT DOCUMENTS

| | | | |
|---|---|---|---|
| 3,958,509 | 5/1976 | Murray et al. | 101/DIG. 24 |
| 4,233,663 | 11/1980 | Sugawara et al. | 358/78 X |
| 4,319,268 | 3/1982 | Yamada | 358/75 |
| 4,384,337 | 5/1983 | Mamberger et al. | 364/518 |
| 4,446,470 | 5/1984 | Sugiyama et al. | 358/75 |
| 4,470,074 | 9/1984 | Yamada | 358/75 X |
| 4,573,190 | 2/1986 | Tsunoda et al. | 358/107 X |

FOREIGN PATENT DOCUMENTS

| | | | |
|---|---|---|---|
| 2022514A | 12/1979 | United Kingdom | 101/DIG. 24 |
| 2140353A | 11/1984 | United Kingdom | 101/DIG. 24 |

Primary Examiner—W. B. Perkey
Attorney, Agent, or Firm—Poms, Smith, Lande & Rose

[57] ABSTRACT

Disclosed herein is a method for collecting data on the amounts of inks to be fed, said data being useful in adjusting the feed amounts of the inks in a printing machine. Desired regions of reproduced pictures, which regions are effective for reproduction, are identified by two-dimensionally arranged addresses of plural picture elements for respective color-separated printing plates, which are adapted to produce printed matter, upon preparation of the reproduced pictures for the color-separated printing plates, thereby to divide the regions into sections adapted to sample the amounts of inks required therefor; the average values of percent halftone dot areas or picture densities in the respective sections are determined; and the average values are then filed in combination with the addresses of the corresponding sections. Printed pictures of best quality can be economically obtained by either on-line or off-line adjusting the ink fountains of the printing machine in accordance with the ink amount data.

6 Claims, 14 Drawing Figures

FIG. 9
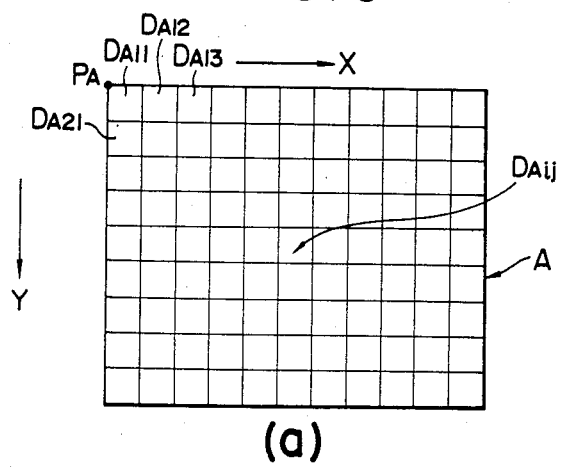
(a)
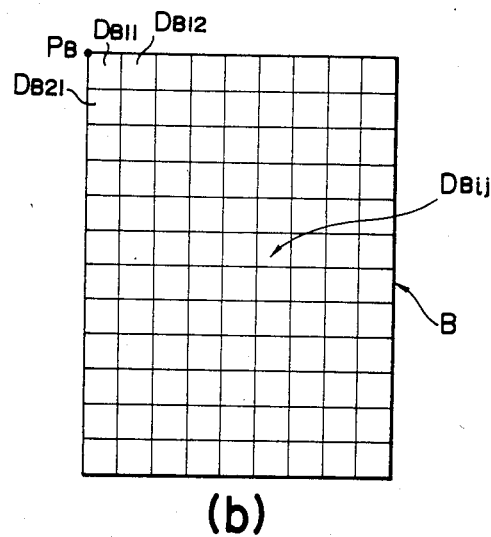
(b)
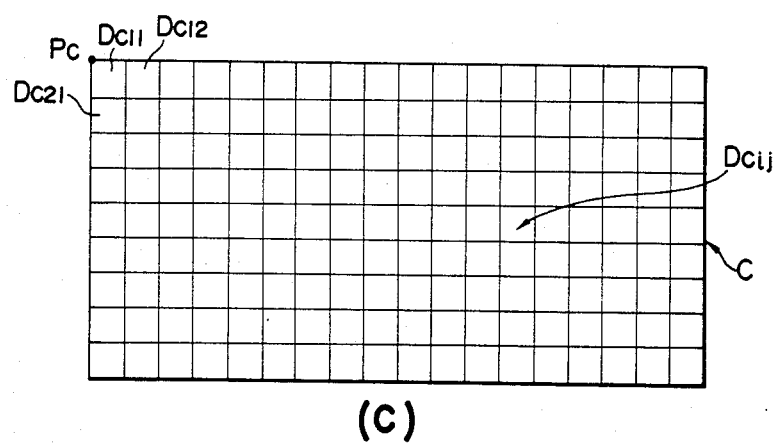
(c)

COLLECTION METHOD OF DATA ON FEED AMOUNT OF PRINTING INK AND SYSTEM THEREFOR

This invention relates to a method for collecting data to determine the feed amount of an ink in accordance with the density of each picture in a printed matter, which method comprises presetting the feed amount of the ink in accordance with the ink amount expected for use at each printing area in a printing machine and feeding the ink in a suitable amount to a printing plate, and a system therefor.

In order to improve the quality of resulting printed matter and to reduce the consumption of inks in printing machines of recent years, the amounts of respective inks are controlled, to such levels that correspond to their amounts expected for consumption upon actual printing, by individually adjusting a number of ink fountains arranged along the axes of their respective ink fountain rollers.

Data required for effecting the above-described adjustment are generally determined in advance by measuring the areas of respective printing parts on each printing plate to be employed for printing or in accordance with the judgement of each printing operator.

A large apparatus is however indispensable to measure the areas of respective printing parts on each printing plate, because the printing plate is by itself of a large size. In addition, highly-accurate sensors are also required, since such measurements deal with halftone pictures composed of printed areas and non-printed areas which are difficult to distinguish from each other on their corresponding printing plates. As a result, the above method requires expensive measuring instruments which are difficult to operate.

This invention relates to a method for collecting data useful in the adjustment of the feed amounts of printing inks, in which method upon color-separating a given original by a color scanner and preparing halftone-photographed and color-separated printing plates, halftone data are measured simultaneously with the preparation of the color-separated printing plates so as to collect and file in advance data on the amounts of inks required to printing parts, and the corresponding ink fountains are then adjusted on the basis of the data file, and to a system therefor.

Furthermore, the data collected in accordance with this invention and useful in the adjustment of feed amounts of respective inks can be used to determine the feed amounts of the corresponding inks, which feed amounts feature little printing irregularity, by correcting them in accordance with the technique proposed in Japanese Patent Application No. 94574/1983, entitled "Setting Method for Feed Amounts of Inks" and assigned commonly to the present assignee.

It is rather simple to calculate the amounts of inks required in a picture when a piece of printing plate is prepared in its entirety at once by a color scanner as in a layout scanner.

This is however not the case when making a printing plate by a small layout scanner or a conventional color scanner, because color-separated printing plates are first prepared original by original, subjected to assembly, trimming, formation of clipping masks, etc. in subsequent steps, and then formed into a printing plate corresponding to the whole picture. Even if the amounts of required inks are determined in advance during the printing plate-making steps for the individual originals, it is very complex to total such amounts area by area in accordance with the prescribed layout conditions. For these reasons, neither method nor system has yet been materialized to practice the above-mentioned approach.

In order to provide sufficient layout flexibility to cope with such situations as mentioned above, according to this invention, each printing area is divided into small regions for sampling the amounts of inks required there so that appropriate feed amounts are determined for the inks, data on the required amounts of the inks are then calculated picture unit by picture unit (i.e., region by region), and data pertaining the amounts of inks required for the respective areas in the whole printing plate are then obtained in accordance with the manner of picture assembly, trimming, etc.

For this purpose, small picture regions from which the amounts of the inks required are sampled are divided out with the same area, preferably, of a square shape. When such small sampling regions are assembled with their boundaries in contact with each other, the method of this invention can cope with the direction of the assembly. The method of this invention can also cope with the problem that picture regions, which have existed as effective scanning regions when processed by a scanner, are reduced in number by subsequent layout processings such as trimming and formation of clipping masks.

In regard to a single piece of picture or original, pictures within a scanning area are divided into small regions from which the amounts of inks required there are respectively sampled out. The amount of the ink required for each region of the same area, in other words, the value of sum of the areas of black halftone dots corresponding to the density of the picture contained in the region (hereinafter called "summed halftone dot data", which are not limited merely to data on the corresponding halftone picture but include data on characters, line drawings, flat tint, etc.) is filed in combination with its corresponding positional information in the corresponding scanning area. The resultant data file is then stored in a cassette tape or floppy disk.

In the subsequent editing stage, another file for the summed halftone dot data on the final printed matter or printing plate is created, using a microcomputer, for example, a personal computer equipped with a microprocessor of the 8-bit class, in accordance with the approximate arrangement of individual pictures on the printing plate and the manner of trimming mask and clipping, and also by adding character information and such information as flat tint and gradation halftone.

When a layout scanner has been employed, information on characters, flat tint and gradation halftone have already been handled as a single picture. Use of such a layout scanner is thus convenient.

When setting the accuracy of summed halftone dot data at the overall level, a relatively low accuracy level may be acceptable because the amounts of inks required on actual printed matter have been precisely set for individual printing plates. Unlike dot-etching, it is therefore unnecessary to apply changes to halftone dot areas after the preparation of color-separated printing plates.

In addition, the adjustment of ink fountains cannot control one or more inks independently over a predetermined width but the feed areas of such one or more inks are overlapped along a relatively-large width adjacent to the ink fountains corresponding to the one or more inks, whereby the ink fountains affect each other.

In one aspect of this invention, there is thus provided a method for collecting data on the amounts of inks to be fed, said data being useful in adjusting the feed amounts of the inks in a printing machine, characterized in that desired regions of reproduced pictures, which regions are effective for reproduction, are identified by two-dimensionally arranged addresses of plural picture elements for respective color-separated printing plates, which are adapted to produce printed matter, upon preparation of the reproduced pictures for the color-separated printing plates, thereby to divide the regions into sections adapted to sample the amounts of inks required therefor; the average values of percent halftone dot areas or picture densities in the respective sections are determined; and the average values are then filed in combination with the addresses of the corresponding sections.

In another aspect of this invention, there is also provided a system suitable for use in the collection of data on printing inks to be fed, comprising:

color scanner means for scanning an original to record reproduced pictures for respective color-separated printing plates;

summing and averaging means for the main scanning direction, said summing and averaging means being adapted to add and average values of percent halftone dot areas or densities of color-separated signals corresponding to the respective ink colors of the color scanner means per every desired number of picture elements arrayed in the main scanning direction;

summing and averaging means for the subscanning direction, said summing and averaging means being adapted to add and average a prescribed number of the values, which have been summed and averaged in the main scanning direction, in the subscanning direction;

address generator means for the main scanning direction, said address generator means being adapted to advance the address of each region, from which the amount of its corresponding ink to be fed is sampled, one by one whenever the picture elements are counted in the main scanning direction to a number equal to a number of the picture elements to be subjected to summing and averaging each time;

address generator means for the subscanning direction, said address generator means being adapted to advance the address of each region, from which the amount of its corresponding ink to be fed is sampled, one by one whenever the main scanning lines are counted to a number equal to the desired number of the summed and averaged values in the main scanning direction;

memory means designated in address by two-dimensionally arranged addresses output from both of the address generator means and adapted to store data output from the summing and averaging means for the subscanning direction, said data being the average value of percent halftone dot areas or densities of a plurality of picture elements contained in the addresses; and central processing means adapted to control the memory means for data-filing the two-dimensionally arranged addresses in combination with their corresponding data on the averages of halftone dot areas or picture densities of necessary ink-amount sampling sections defined by the addresses.

As has been described above, the amounts of inks on their respective printing plates can be determined by obtaining the amounts of inks of reproduced pictures corresponding to trimmed regions of an original simultaneously with the preparation of the respective color-separated printing plates, and upon pasting up the reproduced pictures, giving information on their pasting-up positions and their contours to the above-obtained ink amounts, and then filing the resultant information as data corresponding to the reproduced pictures.

Printed pictures of best quality can be economically obtained by either on-line or off-line adjusting the ink fountains of a printing machine in accordance with the ink amount data.

The above and other objects, features and advantages of the present invention will become apparent from the following description and the appended claims, taken in conjunction with the accompanying drawings.

FIG. 9 is an address map of respective data collected upon preparation of the plurality of reproduced pictures;

Figure 13:
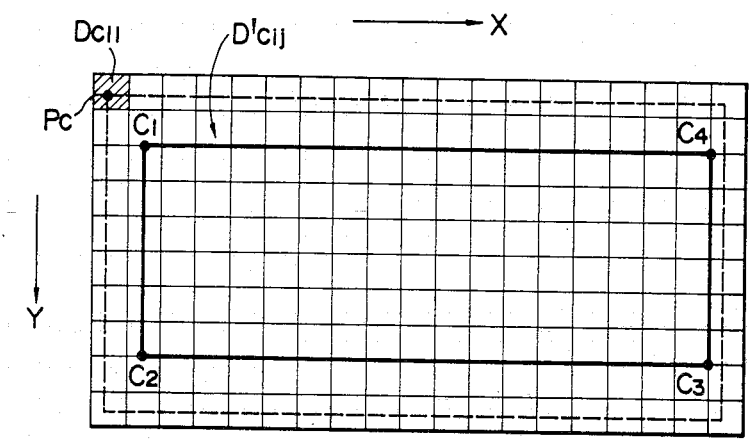
Figure 14:
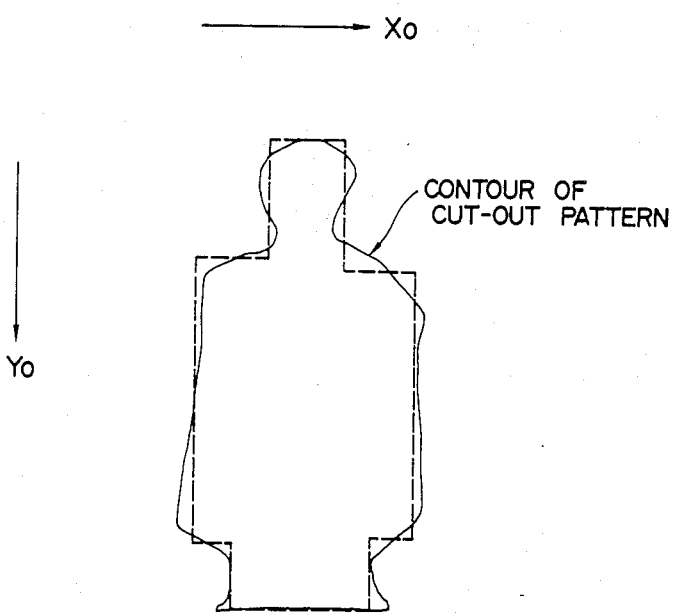

FIG. 13 illustrates the offset between sampling regions on the printing plate and the corresponding regions on the reproduced picture when the effective contour of the sampling regions have been brought into registration with that of the corresponding contour on the reproduce picture; and FIG. 14 shows the effective contour of regions on a printing plate when a cut-out contour is present in a layout sheet, from which regions the amounts of inks are sampled.

Figure 1:
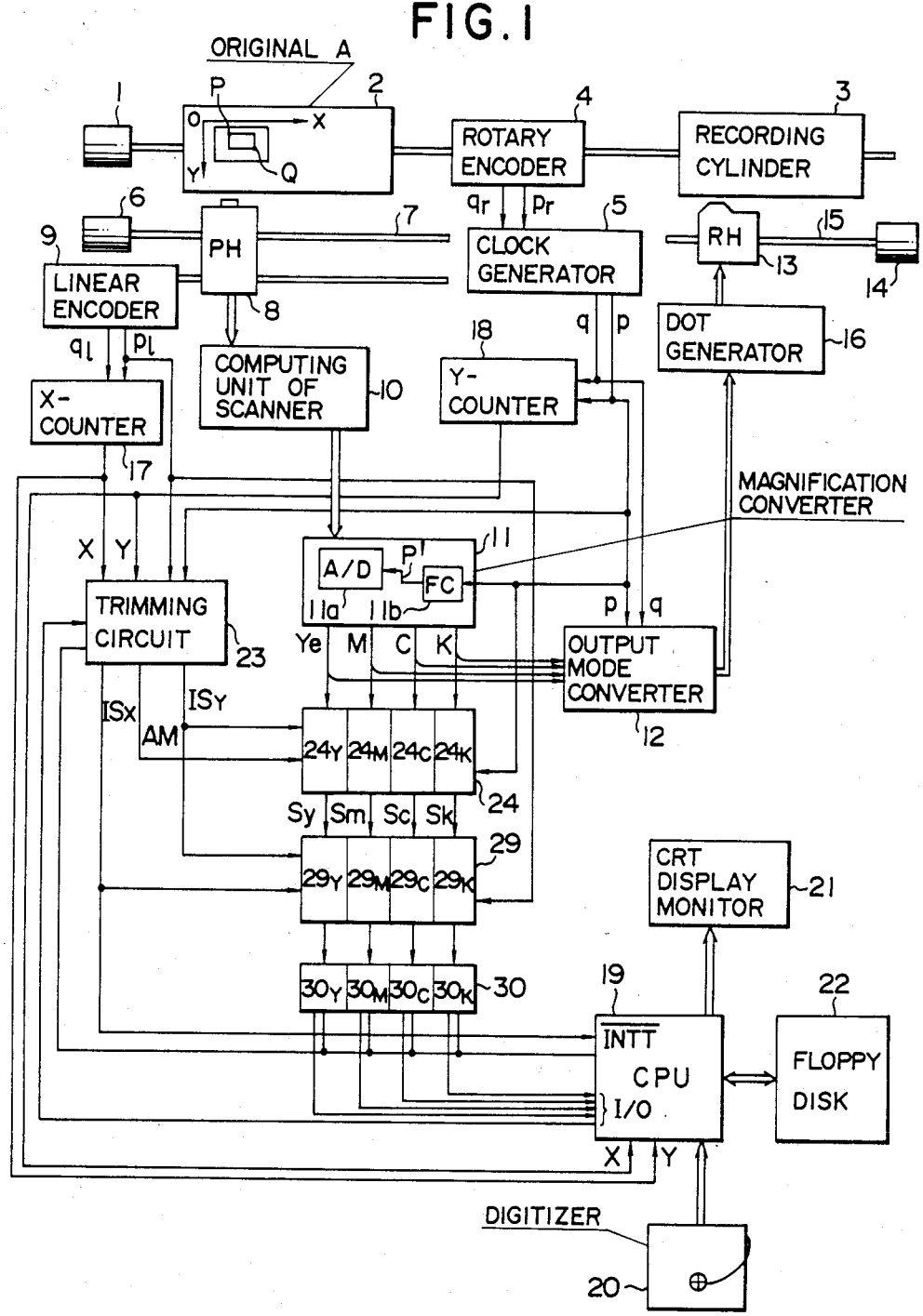
FIG. 1 is a block diagram of a color scanner equipped with a data collection system according to this invention, which data collection system is adapted to collect data useful for the control of the amounts of inks.

FIG. 1 illustrates by way of example a color scanner in which the process of this invention has been incorporated.

In the illustrated embodiment, an input cylinder and a recording cylinder are provided on the same shaft. Needless to say, the present invention can be equally applied even if the color scanner is equipped with separate cylinder drive motors.

Where such separate cylinder drive motors are provided, it is necessary to add a rotary encoder and recording clock generator to the recording side so that picture data, which are transferred in synchronization with the sampling clock of the input side, can be input in synchronization with the recording clock by receiving the picture data via a toggle line buffer.

A drive motor 1 rotates an input cylinder 2 and recording cylinder 3 at a constant speed, while a rotary encoder 4 provided on the same shaft as both of the cylinders 2,3 produces revolution-number dependent pulses ($q_r$), which are generated whenever the rotary encoder 4 is coincided with the coordinate origin in the main scanning direction (i.e., along the Y-axis) on the input cylinder 2, and a series of numerous rotary-angle dependent pulse signals ($p_r$) generated whenever the cylinders 2,3 rotate over given constant angles.

A clock generator 5 determines the frequency of A/D (analog-to-digital) conversion based on the above revolution-number dependent pulses ($q_r$) and rotary-angle dependent pulse signals ($p_r$), whereby to produce a sampling clock (p) for determining the sampling picture element pitch and a one-revolution clock (q) for synchronizing the scanning point with the origin of the coordinate system.

A drive motor 6 rotates a feed screw 7 at a constant speed corresponding to a magnification so that a pickup head 8 is carried along the X-axis.

A linear encoder 9 produces pulses at a prescribed point to generate feed pulse signals ($p_1$) whenever the pickup head 8 is shifted over a uniform distance (for example, 10 μm). Incidentally, a coordinate origin signal ($q_1$) which serves as a logic level "H" is also generated here when the pickup head 8 is located on the X-axis origin of a preset absolute position.

This coordinate origin signal ($q_1$) can be readily produced by a position-detecting switch (not illustrated), for example, a magnet switch or the like provided in the vicinity of the pickup head 8 and linear encoder 9.

The pickup head 8 scans the original A mounted on the input cylinder 2 and divide a flux of light, which has penetrated through the original or has been reflected by the original, into three fluxes, which are caused to pass through blue(B), green(G) and red(R) filters respectively and are then subjected to photoelectric conversion for obtaining color-separated picture data of the RGB system.

At a computing unit 10 of the scanner, the picture data are then subjected to prescribed color masking processing, color correction, sharpness emphasizing processing, graduation correction and the like so that they are converted to color-separated picture data of the YeMCK system corresponding to the amounts of the inks of yellow(Ye), magenta(M), cyan(C) and black(K).

Picture data which have been processed by the computing unit 10 of the scanner are thereafter converted, color-separated signal by color-separated signal (Ye), (M), (C) and (K) and in synchronization with the clock pulse (p), into corresponding digital signals (let's suppose that each color is 8-bits long) at a magnification-changing unit 11 equipped with an A/D converter 11a.

Usually, the magnification-changing operation can be performed concurrently with the A/D conversion by changing the frequency of the clock pulse (p) in accordance with the magnification of the reproduced picture at the above-described time point.

However, the clock pulse (p) also serves as a system clock which governs the picture data processing speed of the entire scanner system. If the system clock varies depending on the magnification, the control of the system becomes very irksome.

The magnification-changing unit 11 is hence provided with two line buffers, each which has a capacity equivalent to two scanning operations in the main scanning direction. One of the line buffers writes picture data, which has been A/D-converted, in accordance with a clock pulse (p') obtained by converting the frequency of the clock pulse (p) in accordance with the magnification, whereas the other line buffer reads out the contents of stored information, which have been written in by the clock pulse (p'), in accordance with the clock pulse (p) which also serves as the system clock. It is commonly practiced to make the transfer speed of picture data constant after the magnification-changing unit 11 irrespective of the magnification by alternating the functions of these buffers whenever the scanning line changes.

In this embodiment, for the sake of simpler description, the clock pulse (p) is assumed to be the system clock. It is also assumed that the picture data, which have been output from the magnification-changing unit 11, have already been subjected to a prescribed magnification change as a result of conversion of the clock pulse (p) to the clock pulse (p') corresponding to the desired magnification by a frequency converter 11b equipped with the magnification-changing unit 11, and the reloading of the picture data on the system clock pulse (p) has also been completed.

Picture data on the individual ink colors of yellow-(Ye), magenta(M), cyan(C) and black(K) are simultaneously input to an output mode converter 12, where they are subjected respectively to time-series conversions so as to output reproduced plate-making pictures corresponding to the respective ink colors of Ye, M, C and K, for example, whenever the recording cylinder 3 turns over one-fourth of its circumferential length in the main-scanning direction (see, Japanese Patent Publication No. 18601/1977).

In the above manner, it is possible to output reproduced plate-making pictures of four colors simultaneously with a single recording head 13.

In FIG. 1, there are also shown a drive motor 14 for the recording head 13, a feed screw 15 of the drive motor 14, and a dot generator 16 which individually ON/OFF-controls, with a pitch finer than that of the scanning lines, a plurality of exposing light beams output from the recording head 13, forms halftone dots electronically and then directly records halftone dot pictures for making printing plates.

The elements of structure, which have been described above, are constituent elements common to plate-making color scanner systems.

In the present invention, there are also provided, in addition to the above elements, an X-counter 17 for detecting at absolute levels the coordinates of each position of the pickup head 8 in the X-direction and a Y-counter 18 for detecting at absolute level the coordinate of each position of the pickup head 18 in the Y-direction.

In the present invention, by continuously monitoring the pickup coordinates of picture elements of the original A in terms of coordinates output from both counters 17,18, each required trimming region on the original A is divided further into smaller sections. Simultaneously with the scanning of the original, the amounts of the respective inks of yellow(Ye), magenta(M), cyan(C) and black(B) required for the respective smaller sections are determined, and data on the amounts of the inks required for the respective smaller sections are stored, as data correlated with the original (A), at suitable locations in a RAM area of a CPU (central processing unit) 19 which makes up a microcomputer.

The CPU 19 is principally composed of a microprocessor of 8 bits or so, and is equipped with a ROM area for storing desired system programs therein and the RAM area for storing control data, processed data and the like. It is a microcomputer including a digitizer 20 (or a keyboard) as a peripheral input device, a CRT display monitor 21 as a peripheral output device and a floppy disk 22 as an auxiliary memory device.

Figure 2:
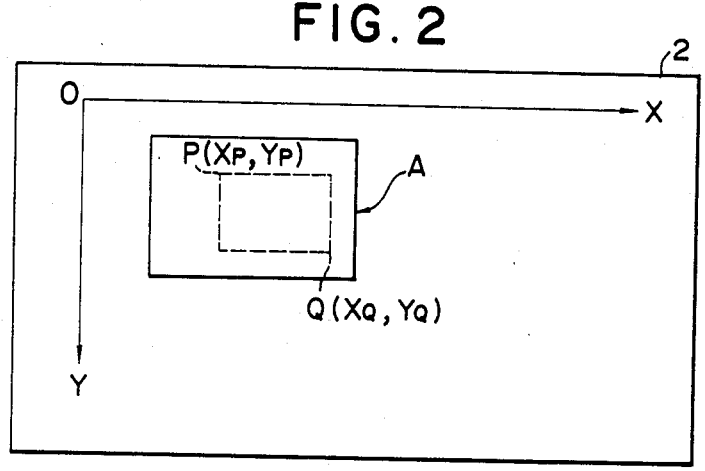
FIG. 2 is an enlarged plan view of an original mounted on the input cylinder illustrated in FIG. 1.

FIG. 2 shows, on an enlarged scale, the original A mounted on the input cylinder 2 in FIG. 1. In FIG. 2, a point O indicates a coordinate origin on the circumference of the input cylinder 2. When the pickup head 8 is located at this coordinate origin, the X-counter and Y-counter of FIG. 1 are both zero and the coordinates by both counters 17,18 are (0,0).

The points P,Q indicate effective scanning regions (hereinafter called "pickup regions"), which one wants to reproduce and record out of the original A. Let's represent the coordinates of these points by $(X_P, Y_P)$ and $(X_Q, Y_Q)$ respectively.

Furthermore, the color scanner of FIG. 1 is applied to a square region on the input cylinder 2, which square region has been chosen as a target scanning region. The square region is reproduced and recorded on a corresponding square region on the recording cylinder 3.

It is necessary to make the divided small sections square by making the numbers of picture elements aligned respectively in the X-direction and Y-direction equal in the small region adapted to measure the amounts of inks to be used.

In the above manner, the amounts of inks of the individual plates on a printing plate obtained by assembling a plurality of reproduced pictures can be calculated with ease even when the reproduced picture is rotated in the coordinate system.

Many of conventionally-employed color scanners however employ such a method that a rectangular region on an original is reproduced and recorded on a rectangular region on the recording cylinder. Even if the small region adapted in accordance with this invention to calculate the amounts of the respective inks to be used takes a rectangular shape, no problems will arise provided that the amounts of the inks on the corresponding printing plate are calculated taking the above fact into consideration.

When it is impossible to cut a small region into square picture elements for such reasons as varied magnification, the number of picture elements in the X-direction may be rendered different from that in the Y-direction in order to form square picture elements.

Figure 3:
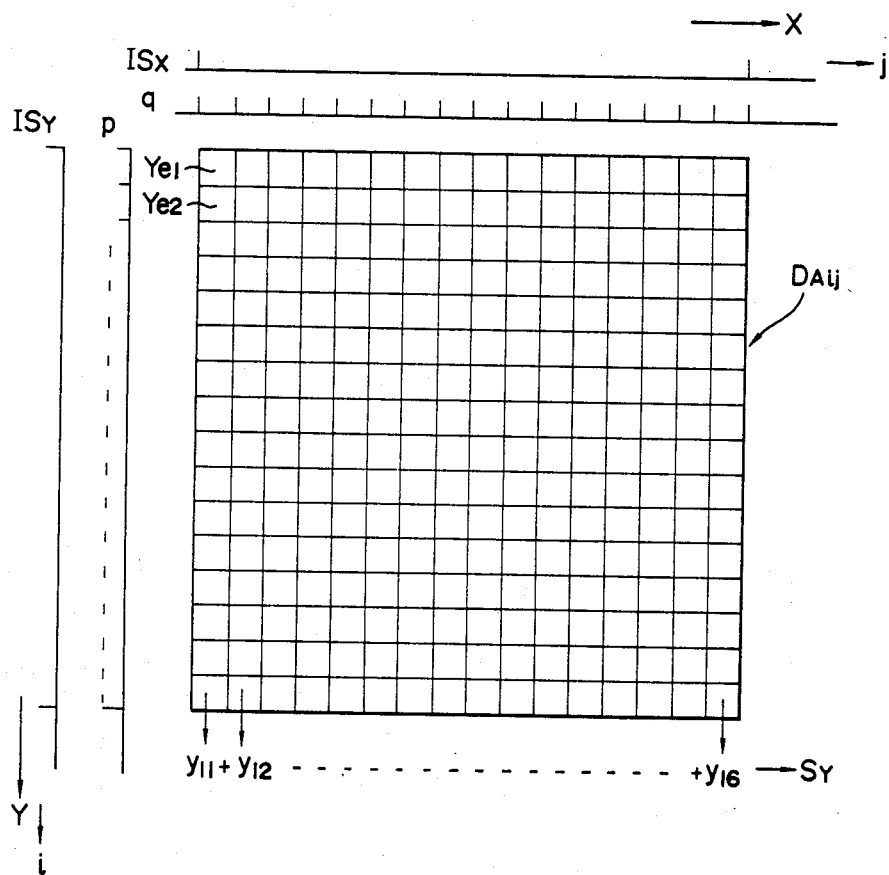
FIG. 3 is an address map of regions in which the amounts of their respective inks are sampled.

In this embodiment, the small region is now assumed to be square and has such a size that its sides are equivalent to 16 picture elements in both X- and Y-directions and it thus contains 256 picture elements in total. FIG. 3 illustrates the small region.

With reference to FIG. 1, the operation of a system according to this invention will next be described in detail.

First of all, an operator applies the original A on the input cylinder 2 and designates the points P,Q, which are adapted to divide the required trimming region (i.e., the effective pickup region), in terms of their coordinates in an absolute coordinate system on the input cylinder 2.

The designation of these coordinates P,Q can be effected by shifting the input cylinder 2 and pickup head 8 manually to bring the scanning point of the pickup head 8 into registration with the points P,Q and then having the CPU 19 read their coordinates from the X-counter 17 and Y-counter 18. The CPU 19 determines, relative to the coordinate origin O, the coordinates $(X_P, Y_P), (X_Q, Y_Q)$ as values converted in terms of the corresponding numbers of picture elements.

Then, the CPU 19 sets these coordinates $(X_P, Y_P), (X_Q, Y_Q)$ in a trimming circuit 23.

The trimming circuit 23 compares the respective counts (X)(Y) of the X-counter 17 and Y-counter 18 with the coordinates $(X_P, Y_P), (X_Q, Y_Q)$ to output a masking signal AM which defines a region to be trimmed.

The masking signal AM is set in such a way that when the scanning point (X,Y) is located inside a trimming region in which X and Y fall respectively within the following ranges:

$X_P \leq X \leq X_Q$; and $Y_P \leq Y \leq Y_Q$, the masking signal AM takes the logic level "H" and outside the above ranges, it takes the logic level "L".

Furthermore, the trimming circuit 23 outputs a signal defining the ink amount sampling region in the X-direction (hereinafter called "X-defining signal") $IS_X$ and another signal defining the ink amount sampling region in the Y-direction (hereinafter called "Y-defining signal") $IS_Y$, which signals respectively generate one pulse whenever the scanning point moves from the coordinates $(X_P, Y_P)$ of the point P as the starting point, in synchronization with the masking signal AM, and over 16 picture elements respectively in the X-direction and Y-direction.

In addition, the trimming circuit 23 is set in such a way that it stops the outputs of both definition signals $IS_X, IS_Y$ when the scanning point has moved out of the trimming region and the masking signal AM has reached "L".

Designated at numeral 24 is a Y-direction summing and averaging circuit adapted to determine the sum averages of every 16 picture elements starting from the coordinate $Y_P$ in the main scanning direction (the Y-direction) with respect to the picture signals Ye,M,C,K for the respective ink colors. With respect to each ink color, there are four sets of summing and averaging circuits of the same type.

Figure 4:
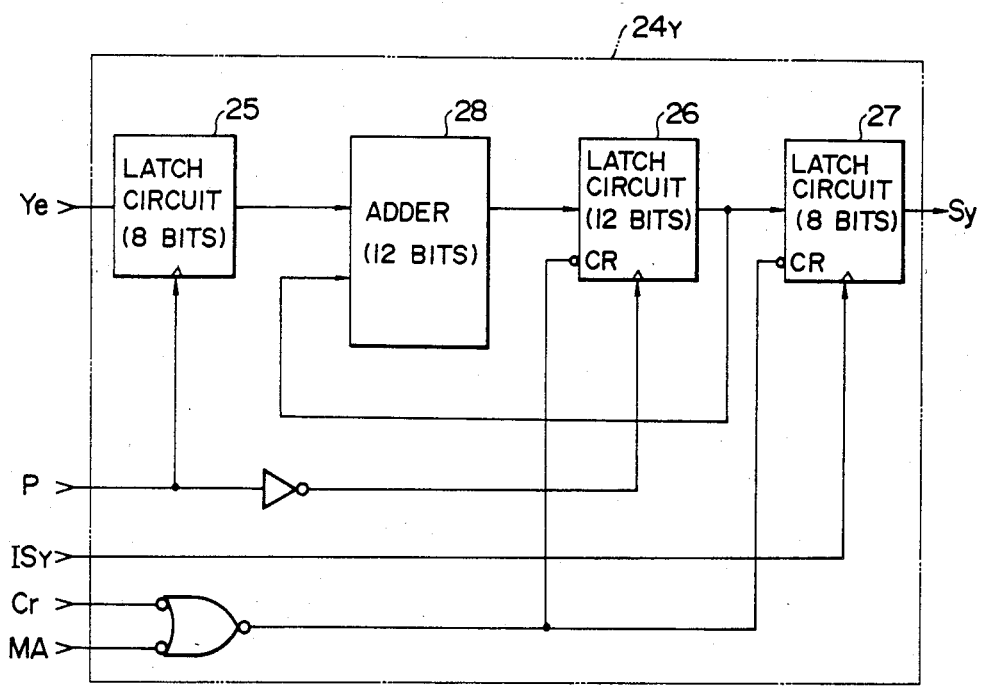
FIG. 4 is a block diagram illustrating one specific example of the Y-direction summing and averaging circuit in FIG. 1.
Figure 5:
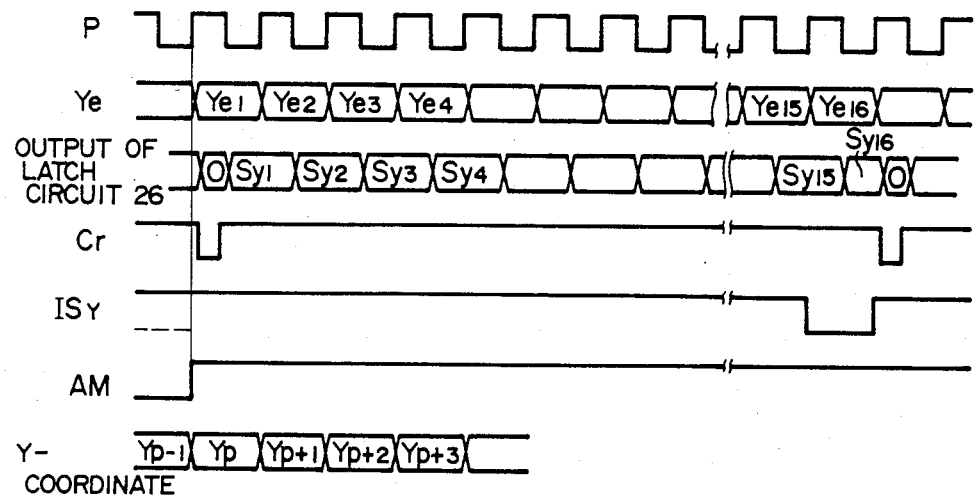
FIG. 5 is a timing chart useful in describing the operation of the circuit of FIG. 4.

FIG. 4 illustrates one example of the summing and averaging circuit $24_Y$ pertaining to the Ye ink. FIG. 5 is a timing chart of the operation of the circuit.

In FIG. 4, latch circuits 25,26, and 27 latch their respective input data when the signals applied respectively to their latch input terminals (CK) rise to their "H" levels, and clears their contents when the clear signals Cr applied respectively to their clear input terminals CR are at "L".

As soon as the scanning point reaches $Y_P$, the masking signal AM turns to the "H" level. In synchronization with this, there is generated a clear signal Cr which in synchronization with the X-defining signal $IS_X$, produces a clear pulse per every 16 picture elements.

Per every subsequent 16 picture elements in the main scanning direction, the percent halftone dot areas or densities of the picture elements for that section are summed and averaged, and output as a Y-direction summed and averaged signal $S_Y$.

Incidentally, in FIG. 5, $Y_{ei}$ means the signal for each picture element and $S_{yi}$ indicates its total up to the $i^{th}$ picture elements, namely, $$\sum_{i=1}^{16} Y_{ei}$$

In FIG. 4, the numeral 28 indicates an adder of 12 bits long, which adds the newly-transferred percent halftone dot area or density data $Y_e$ of picture element to the intermediate sum after generation of a clear signal Cr and latches the result of the addition to the latch circuit 26. At the end of the summing of data for 16 picture elements, the number of bits of the sum becomes 12-bit long at the maximum.

Each output of the latch circuit 26 performs an averaging operation of 1/16 by causing its upper 8 bits to be latched to the latch circuit 27 at the rise time of the Y-defining signal $I_{SY}$.

The thus-obtained Y-direction added and averaged signals $S_Y$, which serve as intermediate sum data in the main scanning direction, i.e., in the Y-direction, are transferred to a subscanning X-direction summing and averaging circuit 29, where they are summed and averaged per every 16 picture elements in the X-direction after the coordinate $X_P$. Then, the amounts of inks for the respective color printing plates for each small sections starting from the point P are latched in a latch circuit 30.

Figure 6:
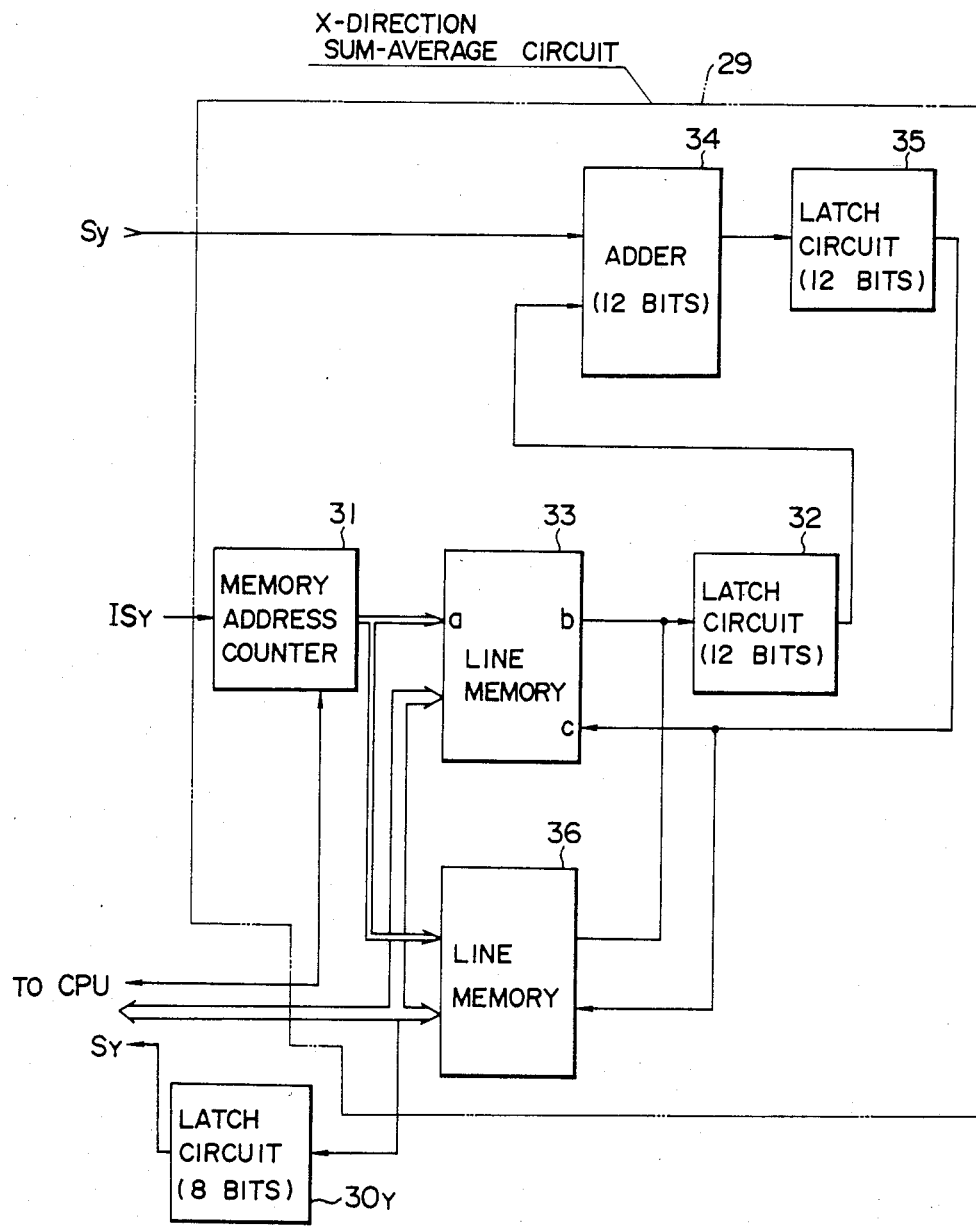
FIG. 6 is a block diagram illustrating one specific example of the X-direction summing and averaging circuit in FIG. 1.
Figure 7:
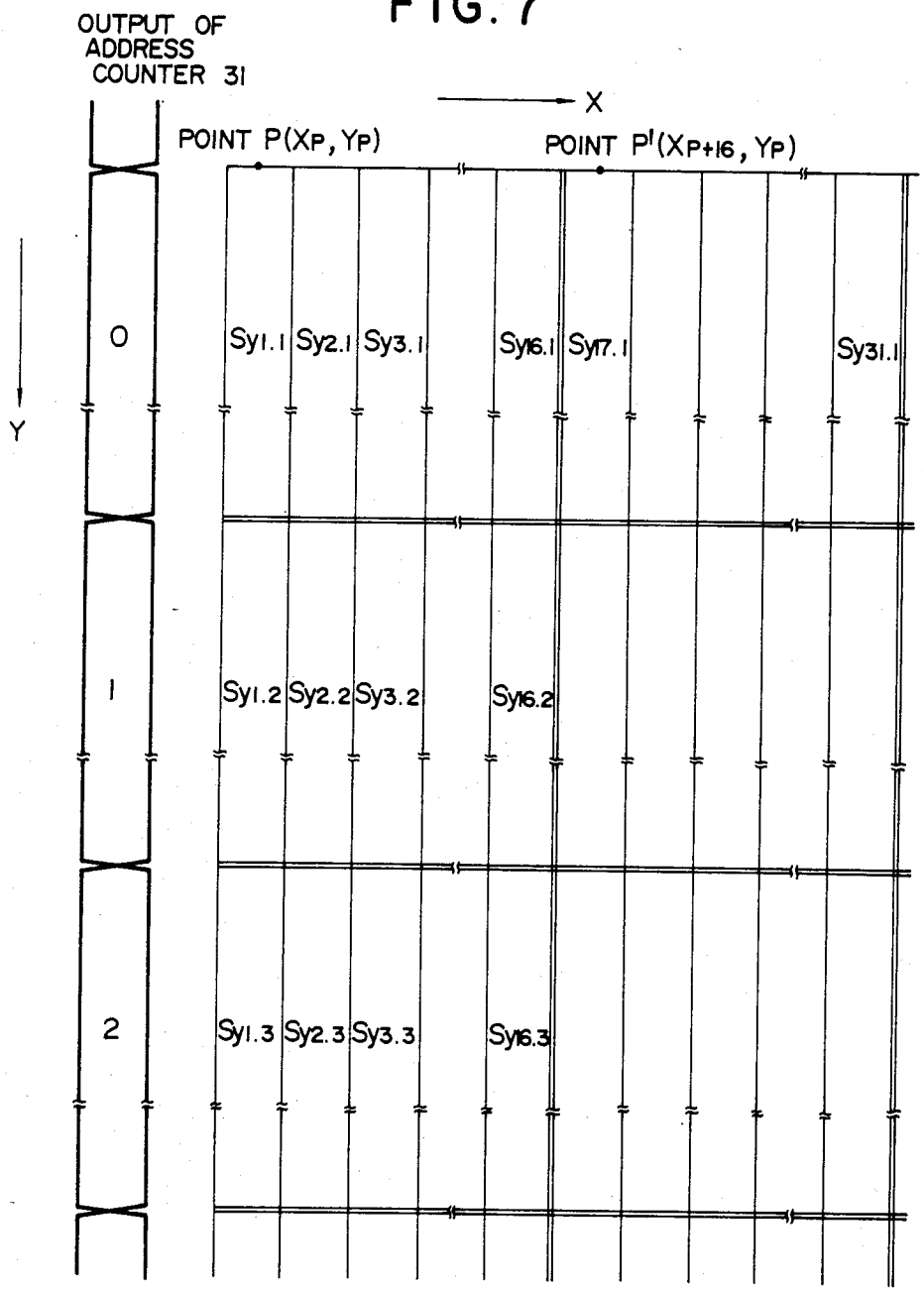
FIG. 7 is an address map of respective data, which map illustrates the operation of the circuit of FIG. 6.

FIG. 6 is a circuit block diagram illustrating one specific example of the subscanning X-direction summing and averaging circuit 29 for the yellow printing plate. FIG. 7 is an address map for describing its operation. By the way, the areas $S_{y1,1} + S_{y1,2} + \ldots + S_{y1,16}$ in FIG. 7 are equal to the areas shown in FIG. 3.

The point P in FIG. 7 is a trimming-initiating point on the original. It is indicated that the Y-direction added and averaged signal $S_Y$ output from the Y-direction summing and averaging circuit $24_y$ is $S_{y1,1}, S_{y1,2}, \ldots$ at $X=X_P$; $S_{y2,1}, S_{y2,2}, \ldots$ at $X=X_P+1$. The values of a memory address counter 31 while these $S_{y1,1}$ and $S_{y1,2}$ are output are shown on the left side of the drawing.

The contents of a latch circuit 32 are kept cleared while the scanning line is located on the first line of each section ($X=X_P$ line and $X=X_P+16$ line in FIG. 7).

As the access timing to a line memory 33, its read-out timing is set in synchronization with the first half of each count cycle (the cycle of the $IS_Y$ pulse) and its writing timing is set in synchronization with its second half.

When the input data to the terminal for Y-direction summed and averaged signal $S_Y$ in a 12-bit adder 34 are $S_{y1,1}$, a latch circuit 32 is immediately after its clearing. Thus, the output of the latch circuit 32 is zero. Thus, the data on the result of addition by the adder 34 becomes $S_{y1,1}$, which is latched to the latch circuit 35. $S_{y1,1}$ is then written in the address 0 of the line memory 33 in the last half cycle of each count cycle.

When the scanning line has proceeded by 1 line and has reached $X=X_{P+1}$, the following operations are performed at the same scanning position on the preceding scanning line.

The first input data on the Y-direction added and averaged signal $S_Y$ to the adder 34 become $S_{y2,1}$. In the first half cycle of each memory access, the contents of its 0 address, i.e., $S_{y1,1}$ are read out from the line memory 33. Upon establishment of the data, the data are latched to the latch circuit 32. Thereafter, the outputs of the adder 34 turn to $S_{y1,1}+S_{y1,2}$.

Next, in the latter half cycle of memory access, the result of addition of both data which result has been input to the adder 34, namely, $S_{y1,1}+S_{y2,1}$ is latched to a latch circuit 35, which is then written in the address 0 of the line memory 33 through the C-input of the line memory.

When this operation is carried out at the same main scanning position ($Y=Y_P$) to $X=X_P+15$, a pulse is generated in the X-defining signal $I_{SX}$ of FIG. 1 at the time point of the end of the former half cycle of the memory access. As an output of the latch circuit 35, a sum of 12 bits long is obtained as shown below.

$$\sum_{i=1}^{16} S_{yi,1}$$

This is written again in the address 0 of the line memory 33 during the half cycle after the above memory access. Upon completion of the scanning line, the line memory 33 is connected to the CPU 19.

In order to store intermediate sums after the next scanning line, a line memory 36 which has been connected to the CPU 19 by that time is connected to the scanner side.

The line memory 36 is used to cumulate data on small sections from $X=X_P+16$ line to $X=X_P+31$. In the course of this cumulation, the CPU 19 can obtain data on the ink amounts for the small sections from $X=X_P$ to $X=X_P+15$ by receiving the upper 8 bits out of the 12 bits of the data obtained in the line memory 33 and relating to the ink amounts for the small sections in accordance with their addresses so as to perform the averaging operation of 1/16, for example, through the latch circuit 30Y.

Thereafter, the roles of the line memories 33, 36 are alternated sequentially so that sufficient time is obtained for receiving data from the CPU 19.

The thus-obtained data on the amounts of inks for the respective printing plates for the original A are filed and recorded on the floppy disk 22 as data corresponding to the reproduced picture obtained inside the trimming region by the above scanning operation, namely, as two-dimensionally arranged data on a required ink amount sampling region having corresponding addresses in both X-direction and Y-direction with the point P being an origin.

By the way, ink amount data for odd regions fewer than 16 picture elements at the ends of the trimming region in both X- and Y-directions should be thrown away.

It is thus necessary to set each trimming region somewhat wider than its corresponding region required for its pasting-up.

Figure 8:
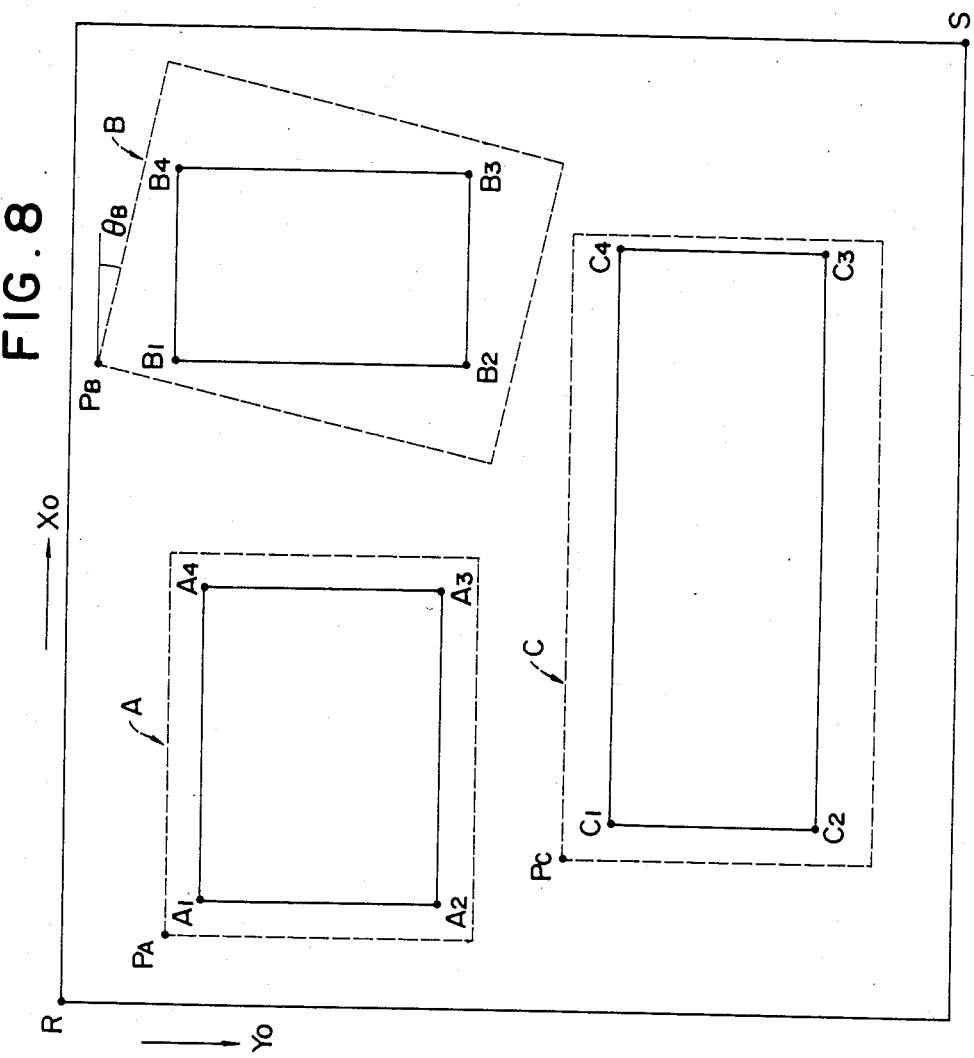
FIG. 8 shows a plurality of reproduced pictures pasted up on a layout sheet, from which pictures data on the feed amounts of inks have been collected by the method of this invention.

FIG. 8 illustrates by way of example three reproduced pictures A, B and C, which have been reproduced and recorded in the above manner, laid out and pasted up on a layout sheet (one page).

This pasting-up operation is generally effected by manual work. In recent years, layout scanners have however been developed to store the picture data of the reproduced pictures A, B and C on large-capacity magnetic memory disks by central processing units,, thereby performing the pasting-up work electronically. Owing to the development of such layout scanners, the time required for the pasting-up work has been reduced.

An object of the present invention is to provide a method for determining with ease the amounts of respective inks of different colors on a printing plate to be obtained by manual pasting-up work. This invention can however be readily applied to such a layout scanner by practicing the above method with a computer. First of all, a manual pasting-up operation is dealt with. One example of its procedure will next be described in detail.

In order to simplify the operation, a digitizer 20 and monitor 21 are corrected as peripheral devices to the CPU 19.

The operator places on the digitizer 20 a layout sheet on which layout is to be performed prior to pasting-up. A digitizer cursor designates the trimming starting points $P_A$, $P_B$ and $P_C$ of the reproduced pictures A,B,C and end points $A_1,A_3$, $B_1,B_3$ and $C_1,C_3$ of the respective effective picture regions.

In the illustrated embodiment, the effective picture regions are rectangular regions extending parallel to the X- and Y-axes. Thus, it is only necessary to define the two end points for each region. If each region should be a closed region of a desired shape, it will be necessary to give a series of coordinates of the closed contour.

Next, end points R,S of the effective region on the layout sheet are input.

The trimming starting points of the respective reproduced pictures A,B,C are located respectively at $P_A$, $P_B$ and $P_C$ as shown in FIGS. 9(a), 9(b) and 9(c). The amount of an ink for each printing plate is cumulated, for example, from one small section of 16×16 to another small section of 16×16. The thus-obtained ink amounts are stored as data arranged in both X- and Y-directions.

In the next description, the ink amount for the yellow printing plate (Ye) will be determined by way of example out of the respective color printing plates Ye,W,C,K.

In FIG. 9, the arrangements of data on the amounts of the Ye ink for the respective reproduced pictures are represented by $D_{Aij}$, $D_{Bij}$ and $D_{Cij}$ respectively.

Figure 10:
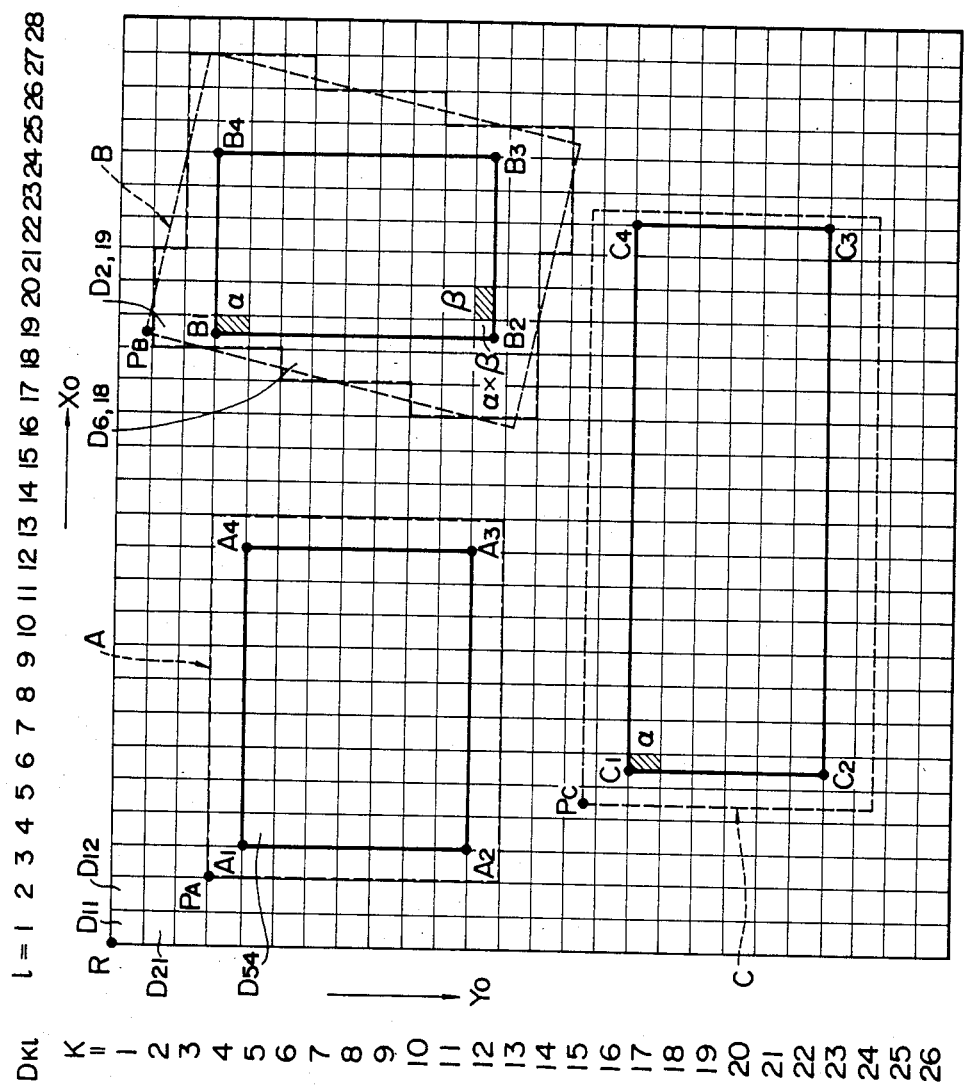
FIG. 10 is an address map of data on the feed amounts of individual inks on a finished printing plate when the plurality of reproduced pictures have been laid out on the printing plate.

FIG. 10 is a diagram for determining the amount $D_{kl}$ of the Ye ink out of the respective ink amounts for the small regions on the printing plates. The reproduced pictures are respectively placed inside regions $(A_1,A_2,A_3,A_4),(B_1,B_2,B_3,B_4),(C_1,C_2,C_3,C_4)$ Outside the above regions, the amount of the ink is set at zero.

First of all, the reproduced picture A is taken into consideration.

Since the small region of the reproduced picture A is coincided with its corresponding small region on the printing plate, the ink amount $D_{kl}$ for the small region kl is given in terms of $D_{Aij}$ by the following equation:

$$D_{kl} = D_{Aij} \quad (1)$$

where $i = k-3$,
$j = l-2$,
$5 < k < 11$
$4 < l < 12$.

Since the reproduced picture B has been turned on the printing plate, the following equation (2) can first be established in subscript between the ink amount $D_{Bi'j'}$, which has been obtained by turning the ink amount data arrangement $D_{Bij}$ of FIG. 9(b) over $-\theta_B$ about a center of rotation (it is assumed that the point $P_B$ has been designated as the center of rotation), and $D_{Bij}$:

$$\left.\begin{array}{l} j' = j \cos\theta - i \sin\theta \\ i' = i \cos\theta - j \sin\theta \end{array}\right\} \quad (2)$$

where the values on the right sides shall be rounded up to integers.

The resultant reproduced picture is then fit in the printing plate. It is indicated by a thicker broken line in FIG. 10.

In Equation (2), the operation results of the right sides are rounded up to integers. After the rotation, the reproduced picture B thus takes a form tilted stepwise along the small region on the printing plate.

Then, the following correlations may for example be established in FIG. 10:

$$\left.\begin{array}{l} D_{2,19} = D_{B11} \\ D_{6,18} = D_{B51} \end{array}\right\} \quad (3)$$

The small region B of FIG. 10 is, as a matter of fact, tilted over $\theta_B$ on the printing plate. Here, an operation is however performed to correlate the small region to the closest small region on the printing plate in such a manner as represented by the equation (3).

It is an object of this invention to obtain data, which are useful in adjusting the ink fountains of a printing plate, prior to the preparation of printing plates. Rough data may still be sufficient as such data. It is therefore sufficient to define the correlation between small regions due to rotation to such an extent as described above.

Ink amounts are then summed and averaged from one printing region, which is divided in the form of a belt-like section parallel to the direction of rotation of the printing plate, to another so that there are obtained data useful in adjusting the ink fountains of the printing machine.

Where one wants to obtain an accuracy higher than the above-obtained accuracy, it is of course feasible to perform an operation, for example, on the basis of the method disclosed in Japanese Patent Application No. 7224/1984.

Figure 11:
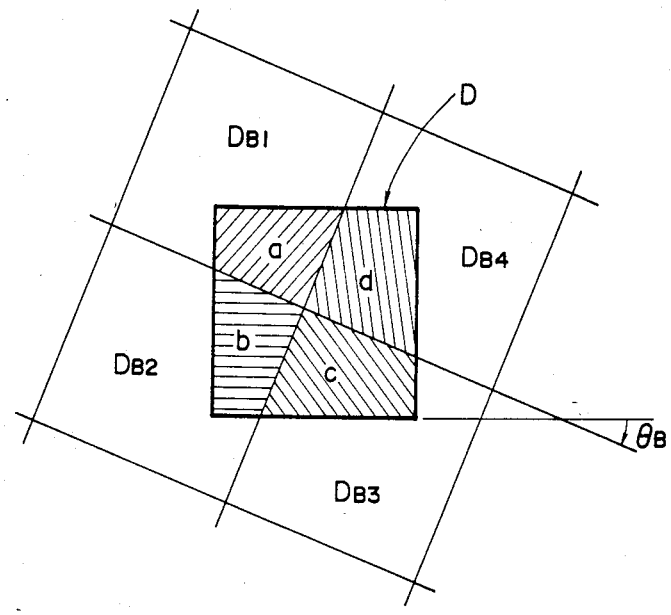
FIG. 11 is a schematic illustration for determining the values of regions on a printing plate when the reproduced picture has been turned, from which regions the amounts of inks are sampled.

Namely, the ink amount D required for a small region on a printing plate shown in FIG. 11 is to be determined in accordance with the following Equation (4), based on the ink amounts $D_{B1},D_{B2},D_{B3},D_{B4}$ for four small regions on a turned reproduced picture and their area proportions:

$$D = \frac{a \cdot D_{B1} + b \cdot D_{B2} + c \cdot D_{1B3} + d \cdot D_{B4}}{a + b + c + d} \quad (4)$$

From the ink amount data $D_{Bi'j'}$ obtained by Equation (2), the ink amount for the small region surrounded by the points $B_1,B_2,B_3,B_4$ on the printing plate of FIG. 9 can be determined by the following Equation (5):

$$\left.\begin{array}{l} \alpha D_{B(k-1)'(l-18)'} \\ \text{where } 4 \leq k \leq 11, l = 19 \\ \beta D_{B(k-1)'(l-18)'} \\ \text{where } k = 12, 20 \leq l \leq 24 \\ \alpha \times \beta \times_{B(k-1)'(l-18)'} \\ \text{where } k = 12, l = 19 \\ D_{B(k-1)'(l-18)'} \\ \text{where } 4 \leq k \leq 11, 20 \leq l \leq 24 \end{array}\right\} \quad (5)$$

Here, $\alpha$ means the ratio of the area (hatched) common to the small region corresponding to $D_{4,19}$ on the printing plate and the region surrounded by $B_1, B_2, B_3, B_4$ to one small section, while $\beta$ means the ratio of the area (also hatched) common to the small region corresponding to $D_{12,20}$ on the printing plate and the region surrounded by $B_1, B_2, B_3, B_4$ to one small section.

In Equation (5), $(k-1)'$ and $(l-18)'$ are subscripts, which can be correlated to the ink amounts $D_{Bij}$ for the small sections on the reproduced picture B in accordance with Equation (2).

Next, in regard to the reproduced picture C, its ink amounts $D_{Cij}$ on the printing plate will be determined.

In this case, the small region on the printing plate and the small region [see, FIG. 9(c)] on the reproduced picture C are not overlapped. Their correlation will be determined.

Figure 12:
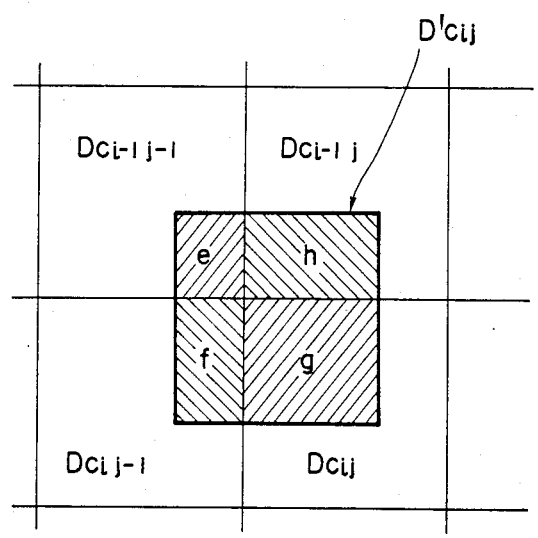
FIG. 12 is a schematic illustration for determining the values of regions on a printing plate when the reproduced picture has moved in both X-direction and Y-direction and the coordinates of the sample region of the reproduced picture have thus been offset from their corresponding coordinates on the printing plate.

Supposing that their offset be a value pertaining to the ratios of areas e, f, g and h depicted in FIG. 12, the ink amounts $D'_{Cij}$ (see, FIG. 13) for the small sections of the printing plate on the reproduced picture C can be determined by the following Equation (6):

$$D'_{Cij} = e \cdot D_{C(i-1)(j-1)} + f \cdot D_{C(j-1)}) + \quad (6)$$

$$g \cdot D_{C(i-1)(j-1)} + h \cdot D_{C(i-1)j}$$

where $$D_{Cij} = \begin{cases} D_{Cij} \ 1 \leq i \leq 9, 1 \leq j \leq 18 \\ 0 \text{ others} \end{cases}$$

Based on $D'_{Cij}$, the ink amount data $D_k$ on the printing plate can be determined as shown by Equation (7):

$$D_{kl} = D'_{C(k-14)(l-4)}$$

where
$17 \leq k \leq 22, 7 \leq l \leq 22$ $\gamma \cdot D'_{C(k-14)(l-4)}$
where
$17 \leq k \leq 22, l = 6$ From Equations (1), (5) and (7), the amounts of the yellow ink for all the small regions on the printing plate can be obtained. Based on these data, it is now possible to adjust the printing ink fountains.

In the above-described embodiment, each of the effective picture regions on the respective printing plates was square. The present invention may be applied in the same manner even when such effective picture regions have contours of desired shapes as a result of clipping. In the latter case, the contours are designated in such a simplified manner as described below, taking into consideration that the data intended to obtain may be relatively rough data.

Namely, let's think of a clipped contour placed on a layout sheet as shown in FIG. 14. The region for obtaining an ink amount is given, as indicated by thick broken lines, as a polygon which extends in parallel with both directions $X_o, Y_o$.

Then, this polygon is divided into a plurality of square sections. Thereafter, ink amount data for its corresponding small region on a printing plate are determined with respect to the respective square sections in the above-described manner.

Having now fully described the invention, it will be apparent to one of ordinary skill in the art that many changes and modifications can be made thereto without departing from the spirit or scope of the invention as set forth herein.

What is claimed is:

1. A method for collecting data on the amounts of inks to be fed, said data being useful in adjusting the feed amounts of the inks in a printing machine, characterized in that desired regions of reproduced pictures, which regions are effective for reproduction, are identified by two-dimensionally arranged, absolute addresses of plural picture elements grouped into sections for respective color-separated printing plates, which are adapted to produce printed matter, upon preparation of the reproduced pictures for the color-separated printing plates; the average values of percent halftone dot areas or picture densities in the respective sections are determined; and the average values are then stored in computer memory in combination with the addresses of the corresponding sections, thereby to divide the regions into sections adapted to sample the amounts of inks required therefor; and said method including the step of obtaining the ink feed data at the time the colored original is scanned for the preparation of the color separated printing plates.

2. A method according to claim 1, wherein the sections are each of a square shape, each side of which is composed of $2^n$ picture elements which are each equivalent to one of the sections divided by the plural picture elements.

3. A method according to claim 1, wherein the average values of percent halftone dot areas or picture densities in the respective sections are obtained by determining the summed and averaged values of the percent halftone dot areas or densities of the individual picture elements arranged in the main scanning direction in the regions one by one from one main scanning line to another, and then summing and averaging the thus-obtained summed and averaged values to obtain the data useful in adjusting the amounts of inks to be fed to the regions.

4. A method according to claim 1, wherein a data file for each of the desired reproduced pictures, which data file is useful in adjusting the amounts of inks for the corresponding reproduced picture, is re-edited in correspondence to the addresses of the sections required on the printing plate after two or more of the reproduced pictures have been arranged with a prescribed layout on the printing plate.

5. A system suitable for use in the collection of data on printing inks to be fed, comprising:
color scanner means for scanning an original to record reproduced pictures for respective color-separated printing plates;

summing and averaging means coupled to the output of said color scanner means, for the main scanning direction, said summing and averaging means being adapted to add and average values of percent halftone dot areas or densities of color-separated signals corresponding to the respective ink colors of the color scanner means per every desired number of picture elements arrayed in the main scanning direction;

summing and averaging means for the subscanning direction, said summing and averaging means being adapted to add and average a prescribed number of the values, which have been summed and averaged in the main scanning direction, in the subscanning direction;

absolute address generator means for the main scanning direction, said address generator means being adapted with respect to an origin prior to each said collection the address of each picture element, from which the amount of its corresponding ink to be fed is sampled, one by one whenever the picture elements are counted in the main scanning direction to a number equal to a number of the picture elements to be subjected to summing and averaging each time, absolute address generator means for the subscanning direction, said address generator means being adapted with respect to an origin to each said collection the address of each Picture element, from which the amount of its corresponding ink to be fed is sampled, one by one whenever the main scanning lines are counted to a number equal to the desired number of the summed and averaged values in the main scanning direction;

memory means designated in address by two-dimensionally arranged addresses output from both of the address generator means and adapted to store data output from the summing and averaging means for the subscanning direction, said data being the average value of percent halftone dot areas or densities of a plurality of picture elements contained in the addresses; and central processing means adapted to control the memory means for data-filing the two-dimensionally arranged addresses in combination with their corresponding data on the averages of halftone dot areas or picture densities of necessary ink-amount sampling sections defined by the addresses.

6. A method for collecting and utilizing data relating to the amount of ink to be fed in a color separation printing process, comprising the step of:

scanning the original pictures and obtaining color separation signals for the preparation of color separated printing plates;

preparing color separated printing plates;

utilizing said color separation signals to provide signals indicating the amount of ink of each color to be fed to each predetermined area for each color of the color printing process;

storing the ink feed signals for each color for each predetermined area in computer memory, along with the two dimensional addresses associated with the ink feed signals for each color and each area of the final intended picture;

retrieving said ink feed signals from computer memory at the time of printing, and selectively controlling ink flow to selected areas of the printing plates for each color in accordance with said ink feed signals.

* * * * *